US009426080B2

(12) United States Patent
Ajima et al.

(10) Patent No.: US 9,426,080 B2
(45) Date of Patent: Aug. 23, 2016

(54) DATA COMMUNICATION APPARATUS, DATA TRANSMISSION METHOD, AND COMPUTER SYSTEM

(71) Applicant: FUJITSU LIMITED, Kawasaki-shi, Kanagawa (JP)

(72) Inventors: Yuichiro Ajima, Kawasaki (JP); Tomohiro Inoue, Kawasaki (JP); Shinya Hiramoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 165 days.

(21) Appl. No.: 14/215,212

(22) Filed: Mar. 17, 2014

(65) Prior Publication Data
US 2014/0198658 A1 Jul. 17, 2014

Related U.S. Application Data

(63) Continuation of application No. PCT/JP2011/071439, filed on Sep. 21, 2011.

(51) Int. Cl.
*H04L 12/835* (2013.01)
*H04L 12/26* (2006.01)
(Continued)

(52) U.S. Cl.
CPC ............ *H04L 47/30* (2013.01); *H04L 43/0888* (2013.01); *H04L 47/12* (2013.01); *H04L 45/28* (2013.01); *H04L 47/25* (2013.01); *H04L 47/283* (2013.01)

(58) Field of Classification Search
CPC ..... H04L 47/25; H04L 47/30; H04L 43/0888; H04L 45/28; H04L 47/12; H04L 47/18; H04L 47/283
USPC ......................................................... 370/235
See application file for complete search history.

(56) References Cited

U.S. PATENT DOCUMENTS 5,432,824 A 7/1995 Zheng et al.
2009/0059958 A1* 3/2009 Nakata ................... H04L 69/14
370/474
(Continued)

FOREIGN PATENT DOCUMENTS

| CN | 101253737 B | * | 2/2013 | ............ H04L 1/1607 |
|---|---|---|---|---|
| JP | H08-56222 A | | 2/1996 | |
| JP | 2000-13391 A | | 1/2000 | |
| JP | 2001-16276 A | | 1/2001 | |
| JP | 2006-303887 A | | 11/2006 | |
| JP | 2008-283621 A | | 11/2008 | |

OTHER PUBLICATIONS

Allman, M., et al., "TCP Congestion Control", Network Working Group, RFC 2581, The Internet Society, pp. 1-15, Apr. 1999.
(Continued)

*Primary Examiner* — Huy D Vu
*Assistant Examiner* — Nizam Ahmed
(74) *Attorney, Agent, or Firm* — Fujitsu Patent Center

(57) ABSTRACT

Provided is a data communication apparatus which includes a transmission interval calculator configured to calculate an effective transfer speed of the data based on a difference between an actual arrival time at which response data to transmission data transmitted to the other data communication apparatus has arrived and a predictive arrival time calculated by multiplying the number of relay devices passed until the response data from the other data communication apparatus arrives at the data communication apparatus by a transfer delay time necessary to pass through one relay device and a buffer size of the relay device on a communication path of the data, and calculate a transmission interval of transmission data based on the effective transfer speed and a transmission controller configured to perform transmission control of transmission data based on the transmission interval. Thus, congestion control is efficiently implemented in an interconnection network configured as a regular network.

12 Claims, 9 Drawing Sheets

(51) Int. Cl.
*H04L 12/801* (2013.01)
*H04L 12/825* (2013.01)
*H04L 12/841* (2013.01)
*H04L 12/703* (2013.01)

(56) References Cited

U.S. PATENT DOCUMENTS

2009/0097483 A1   4/2009   Henocq et al.
2010/0097979 A1*  4/2010   Shinozaki ............ H04L 1/0026
                                                              370/315

OTHER PUBLICATIONS

International Search Report, mailed in connection with PCT/JP2011/071439 and mailed Nov. 22, 2011.

Extended European Search Report mailed on Mar. 11, 2015 for corresponding European Patent Application No. 11872628.0, 4 pages.

Chinese Office Action mailed on Apr. 25, 2016 for corresponding Chinese Patent Application No. 201180073556.8, with English Translation, 13 pages.

* cited by examiner

| PACKET IDENTIFIER p | PACKET TRANSMISSION TIME | MESSAGE IDENTIFIER m |
|---|---|---|
|  |  |  |
|  |  |  |

114

DATA COMMUNICATION APPARATUS, DATA TRANSMISSION METHOD, AND COMPUTER SYSTEM

CROSS-REFERENCE TO RELATED APPLICATION

This application is a continuation application of International Application PCT/JP2011/071439, filed on Sep. 21, 2011 and designated the U.S., the entire contents of which are incorporated herein by reference.

FIELD

The embodiments discussed herein are directed to a data communication apparatus, a data transmission method, and a computer system.

BACKGROUND

An interconnection network connecting nodes with each other in an IP exchange network or a parallel computer is commonly configured by connecting routers transferring a packet with each other. In a large-scale network, a completely connected network in which all nodes are connected in a one-to-one manner is not used because an introduction cost is high, and a mechanism that controls routers such that no competition occurs in a communication path is not used because a cost is high.

For this reason, in a router, when a plurality of packets input from different input ports are transferred, the plurality of packets are likely to compete with one another for one output port.

Generally, a router selects and transfers one packet when output competition occurs, and includes a buffer that stores the remaining competing packets during that period of time and delays the transfer. However, since a buffer amount is limited, when competition continuously occurs among packets, the buffer is depleted. Further, when the buffer is depleted, it is necessary to discard an input packet.

In order to avoid the depletion of the buffer, some routers include a flow control function of requesting connection destination routers of competing input ports to stop packet transmission when the remaining buffer amount is small. Particularly, in a parallel computer, flow control in which a packet is not discarded by strictly managing the remaining buffer amount is commonly performed.

In the flow control, information representing that the buffer has been depleted by competition of packets is transmitted to a router at the upstream side in the flow. Thus, for a transmission source node that continuously transmits a packet to a communication path in which competition is occurring, the buffer of the router connected to the transmission source node is depleted ultimately, and so transmission stops.

Generally, when a transmitting apparatus connected to a network transfers data to a specific destination, the data transfer is continuously performed during a certain period of time, and a communication path in which the data transfer is being continuously performed remains unchanged. Thus, the competition in the communication path continues during the certain period of time, causing discarding of a packet or depletion of a buffer. A phenomenon in which competition of packets in a communication path significantly reduces a data transfer speed as described above is referred to as congestion.

When congestion occurs simultaneously in a number of communication paths, a phenomenon in which a data transfer speed is severely reduced widely occurs. Particularly, in case of the packet discarding, there are cases where a phenomenon in which a data transfer speed is reduced and so communication is nearly impossible occurs, and such a phenomenon is referred to as congestion collapse.

For example, congestion collapse occurs when a discarded packet is continuously transmitted while congestion is occurring or when all buffers of a communication path of up to a competition point are depleted.

In order to avoid a severe reduction in a data transfer speed by congestion collapse, congestion control is performed.

The congestion control is implemented by congestion detection and data transmission control in a transmission source node. Since influence of congestion spreads in a short period of time, it is desirable to detect congestion at an early stage. The transmission source node commonly uses a response packet from a destination node to detect the occurrence of congestion. For example, in a transmission control protocol/Internet protocol (TCP/IP) protocol, the occurrence of congestion is detected by detecting the fact that a response packet does not arrive during a certain period of time. This uses a characteristic in which an IP exchange network discards a packet when congestion occurs.

Further, in an Ethernet extension standard for a data center such as data center bridging (DCB), converged enhanced Ethernet (CCE), or data center Ethernet (DCE), packet loss is avoided by flow control, and a means for detecting congestion as well as a retransmission timeout is provided. (Ethernet is a registered trademark).

For any of congestion detection, a mechanism of detecting congestion in routers is employed, and notification of congestion is given to a router of a packet transmission source by transmitting a dedicated packet from a router to a transmission source node or including a flag in a response packet to be transmitted from a router.

Here, there are cases in which a buffer of a router has no capacity enough to hold a packet when congestion occurs, and so influence of the occurrence of congestion is extremely large. For this reason, when congestion is once detected, there is a possibility that a data transfer speed has been already reduced in a wide range due to congestion, and thus, congestion control is required to solve congestion instead of preventing congestion.

An initial congestion control scheme of TCP/IP was a slow start of decreasing a data transfer speed of retransmission to be lower than a normal data transfer speed and gradually increasing the data transfer speed up to a normal communication speed in order to avoid the re-occurrence of congestion by retransmission of a packet.

In this scheme, when congestion occurs, a process in which the data transfer speed is first reduced, then the data transfer speed gradually increases, and congestion reoccurs is repeated. For this reason, there is a problem in that network usage efficiency is low.

Further, with the increase in the speed of the IP exchange network or the development of a technique of preventing congestion collapse in which a router randomly discards a packet before a buffer is depleted, a congestion control scheme of converging a band more rapidly has been also used.

For example, in the de facto standard of the congestion control protocol for TCP/IP, a data transmission amount is reduced to half each time of retransmission. The congestion control in which a data transmission amount is reduced at this rate is generally referred to as an additive increase multiplicative decrease (AIMD) scheme. In the AIMD scheme, converging is performed with the amplitude of the data transfer speed smaller than that in the slow start described above. However, there is still loss in network usage efficiency.

Patent Literature 1: Japanese Laid-open Patent Publication No HEI8-56222 A

Patent Literature 2: Japanese Laid-open Patent Publication No 2000-13391 A

Non Patent Literature 1: IETF RFC 2581

In the congestion control performed in the IP exchange network of the related art as described above, the router gives notification of packet discarding or congestion, and suppresses a data transfer speed in the transmission source node. However, in the IP exchange network, since it is considered that a network configuration can be designed independently of a type and configuration of a computer to be connected thereto, a network configuration is irregular, and how much the data transfer speed has to be suppressed is not clear. For this reason, a scheme of changing a data transfer speed and finding an appropriate data transfer speed has been also used, but this control scheme has a problem in that the data transfer speed is unstable and the network usage efficiency is low, and is inappropriate for an interconnection network configured as a regular network.

SUMMARY

In order to achieve the above object, a data communication apparatus is a data communication apparatus configured to transmit data to another data communication apparatus through a relay device, and includes a transmission interval calculator configured to calculate an effective transfer speed of the data based on a difference between an actual arrival time at which response data to transmission data transmitted to the other data communication apparatus has arrived and a predictive arrival time calculated by multiplying the number of relay devices passed until the response data transmitted from the other data communication apparatus arrives at the data communication apparatus by a transfer delay time necessary to pass through one relay device and a buffer size of the relay device on a communication path of the data, and calculate a transmission interval of transmission data based on the calculated effective transfer speed, and a transmission controller configured to perform transmission control of transmission data based on the calculated transmission interval.

Further, a data communication apparatus is a data communication apparatus configured to transmit data to another data communication apparatus through a relay device, and includes a transmission controller configured to transmit data such that a total data amount that is a sum of data amounts of transmission data in which response data to transmission data transmitted to the other data communication apparatus does not arrive is a limitation size or less, and a limitation size calculator configured to calculate an effective transfer speed of the data based on a difference between an actual arrival time at which response data to transmission data transmitted to the other data communication apparatus has arrived and a predictive arrival time calculated by multiplying the number of relay devices passed until the response data transmitted from the other data communication apparatus arrives at the data communication apparatus by a transfer delay time necessary to pass through one relay device and a buffer size of the relay device on a communication path of the data, and calculate the limitation size based on the calculated effective transfer speed.

Further, a data transmission method is a data transmission method of transmitting data through a relay device, and includes calculating, by a computer, an effective transfer speed of the data based on a difference between an actual arrival time at which response data to transmitted transmission data has arrived and a predictive arrival time calculated by multiplying the number of relay devices passed until the response data arrives by a transfer delay time necessary to pass through one relay device and a buffer size of the relay device on a communication path of the data, calculating, by the computer, a transmission interval of transmission data based on the calculated effective transfer speed, and performing transmission control of transmission data based on the calculated transmission interval.

Further, a data transmission method is a data transmission method of transmitting data to another data communication apparatus through a relay device, and includes calculating an effective transfer speed of the data based on a difference between an actual arrival time at which response data to transmission data transmitted to the other data communication apparatus has arrived and a predictive arrival time calculated by multiplying the number of relay devices passed until the response data transmitted from the other data communication apparatus arrives at the data communication apparatus by a transfer delay time necessary to pass through one relay device and a buffer size of the relay device on a communication path of the data, calculating a limitation size based on the calculated effective transfer speed, and transmitting data such that a total data amount that is a sum of data amounts of transmission data in which response data to transmission data transmitted to the other data communication apparatus does not arrive is a limitation size or less.

Further, a computer system is a computer system, and includes a communication network configured to include a plurality of relay devices, and a plurality of computation nodes configured to perform transmission and reception of data through the communication network, wherein the computer node includes a transmission interval calculator configured to calculate an effective transfer speed of the data based on a difference between an actual arrival time at which response data to transmission data transmitted to the other computation node has arrived and a predictive arrival time calculated by multiplying the number of relay devices passed until the response data transmitted from the other computation node arrives at the computation node by a transfer delay time necessary to pass through one relay device and a buffer size of the relay device on a communication path of the data, and calculate a transmission interval of transmission data based on the calculated effective transfer speed, and a transmission controller configured to perform transmission control of transmission data based on the calculated transmission interval.

Further, a computer system is a computer system, and includes a communication network configured to include a relay device, and a plurality of computation nodes configured to perform transmission and reception of data through the communication network, wherein the computer node includes a transmission controller configured to transmit data such that a total data amount that is a sum of data amounts of transmission data in which response data to transmission data transmitted to the other computation node does not arrive is a limitation size or less, and a limitation size calculator configured to calculate an effective transfer speed of the data based on a difference between an actual arrival time at which response data to transmission data transmitted to the other computation node has arrived and a predictive arrival time calculated by multiplying the number of relay devices passed until the response data transmitted from the other computation node arrives at the computation node by a transfer delay time necessary to pass through one relay device and a buffer size of the relay device on a communication path of the data, and calculate the limitation size based on the calculated effective transfer speed.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

Hereinafter, exemplary embodiments of the present invention will be described with reference to the appended drawings.

(A) First Embodiment

Figure 1:
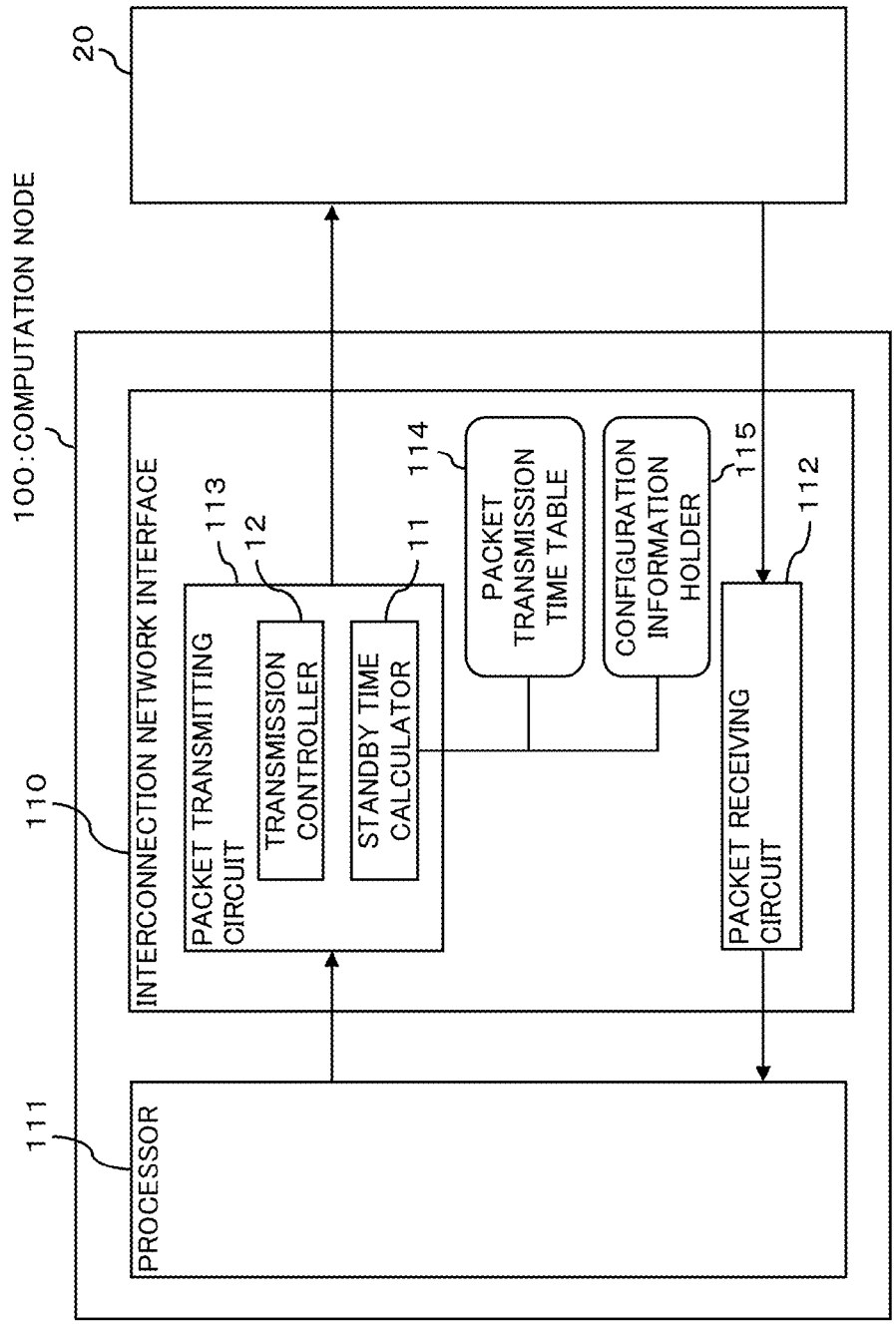
FIG. 1 is a diagram schematically illustrating a functional configuration of an interconnection network interface equipped in a parallel computer system according to a first embodiment.
Figure 2:
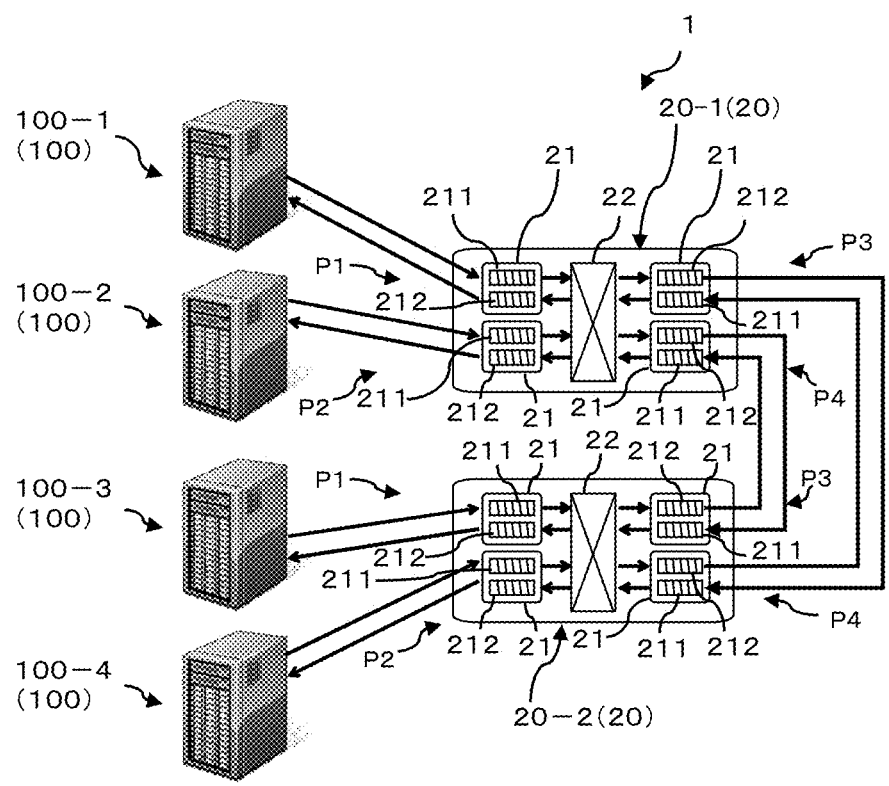
FIG. 2 is a diagram illustrating a configuration of the parallel computer system according to the first embodiment.
Figure 3:
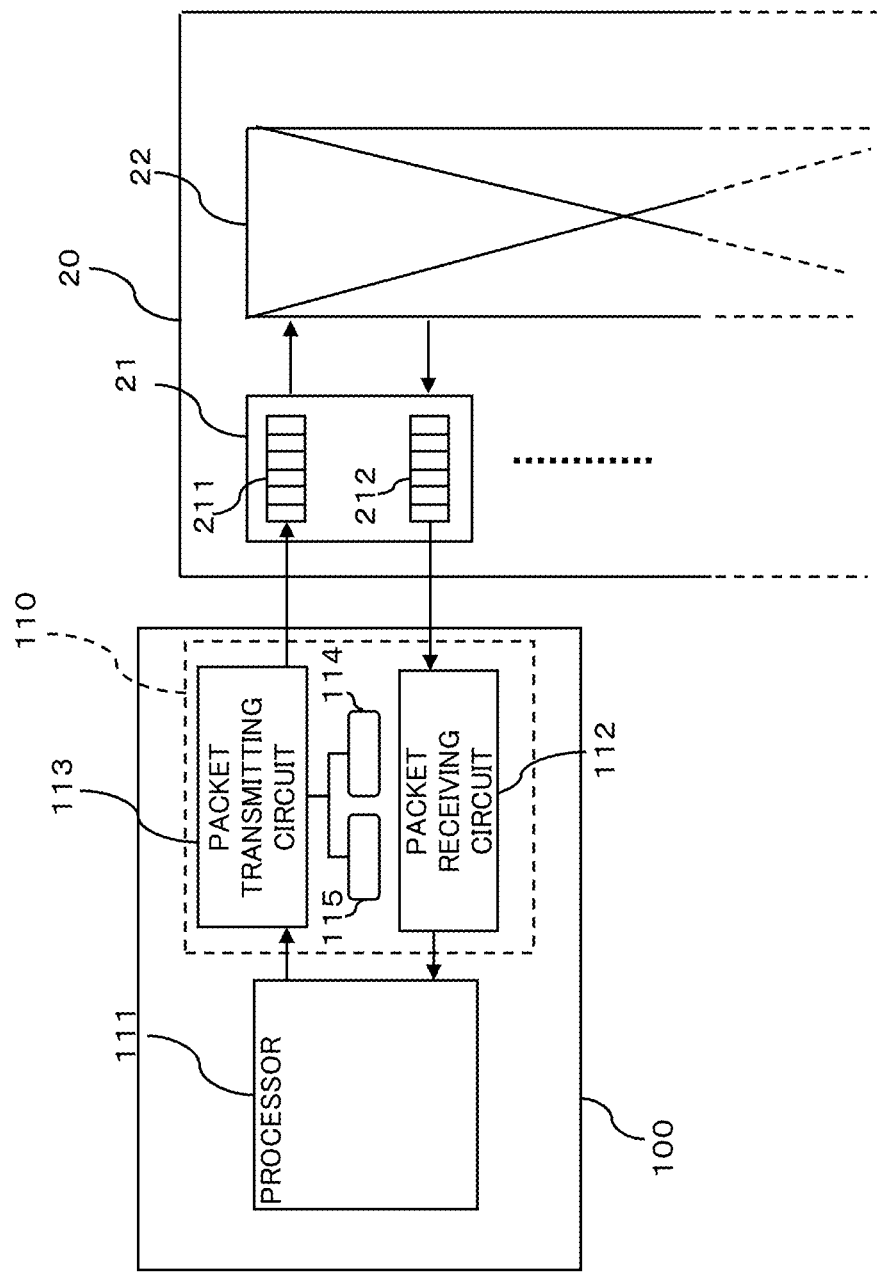
FIG. 3 is a diagram schematically illustrating a hardware configuration of a computation node equipped in the parallel computer system according to the first embodiment.

FIG. 1 is a diagram schematically illustrating a functional configuration of an interconnection network interface in a parallel computer system 1 according to a first embodiment, and FIG. 2 is a diagram illustrating a configuration of the parallel computer system 1. FIG. 3 is a diagram schematically illustrating a hardware configuration of a computation node 100 equipped in the parallel computer system 1 according to the first embodiment.

The parallel computer system 1 according to the first embodiment is configured with an interconnection network (communication network) in which a plurality of computation nodes 100-1, 100-2, 100-3, and 100-4 (four computation nodes in FIG. 2) are connected to be capable of performing communication with one another via one or more routers (switch devices) 20-1 and 20-2 (two routers in an example illustrated in FIG. 2) as illustrated in FIG. 2.

The plurality of computation nodes 100-1, 100-2, 100-3, and 100-4 equipped in the parallel computer system 1 have the same configuration, and the plurality of routers 20-1 and 20-2 also have the same configuration.

Hereinafter, as a reference numeral representing a computation node, reference numerals 100-1 to 100-4 are used when it is necessary to specify one of a plurality of computation nodes, but a reference numeral 100 is used when an arbitrary computation node is designated. Similarly, as a reference numeral representing a router, reference numerals 20-1 and 20-2 are used when it is necessary to specify one of a plurality of routers, but a reference numeral 20 is used when an arbitrary router is designated.

The router 20 is a relay device that is connected to be capable of performing communication with the plurality of computation nodes 100 or another router 20, and transmits a received packet (data) to a transfer destination.

In the example illustrated in FIG. 2, each of the routers 20 includes four ports P1 to P4. In the router 20-1, the computation nodes 100-1 and 100-2 are connected to the ports P1 and P2, and the ports P4 and P3 of the router 20-2 are connected to the ports P3 and P4. In the router 20-2, the computation nodes 100-3 and 100-4 are connected to the ports P1 and P2.

The router 20 includes a transceiving buffer 21 and a crossbar switch 22 as illustrated in FIG. 3. The transceiving buffer 21 is a buffer that temporarily stores transceived data and equipped for each port. The transceiving buffer 21 includes a transmitting buffer 212 and a receiving buffer 211.

For example, the transmitting buffer 212 and the receiving buffer 211 are a buffer memory of a first in first out (FIFO) type. The transmitting buffer 212 is a buffer memory that stores a packet to be transmitted to the computation node 100 or another router 20, and stores a packet acquired via the crossbar switch 22.

The receiving buffer 211 receives and stores a packet transmitted from the computation node 100, another router 20, or the like. The packet stored in the receiving buffer 211 is transmitted to another computation node 100, another router 20, or the like via the crossbar switch 22.

In the parallel computer system 1, data (message) transmitted from each computation node 100 is transceived in a state of packets obtained by dividing the data. A packet length (L) of the packet can be appropriately set to a fixed length or a variable length.

In the parallel computer system 1, the router 20 has a flow control function of requesting the router 20 or the computation node 100 serving as a connection destination of competing input ports to stop packet transmission when the remaining buffer amount of the transceiving buffer 21 is small.

The computation node 100 includes a processor 111 and an interconnection network interface 110.

The computation node 100 is a device having an operation function, and each computation node 100 is connected to be capable of performing communication with the router 20 via the interconnection network interface 110. Through this configuration, the computation node 100 can transmit or receive a packet to or from an arbitrary computation node 100 in the parallel computer system 1.

The processor 111 sequentially acquires packets held in a packet receiving circuit 112 of the interconnection network interface 110, and performs data processing. Further, when data needs to be transmitted to another computation node 100, the processor 111 divides the data to generate packets including a destination address, and outputs the packets to a packet transmitting circuit 113 of the interconnection network interface 110.

The interconnection network interface 110 is an interface device through which the computation node 100 is connected with the router 20 so that communication can be performed therebetween, and controls transmission and reception of a packet from the computation node 100.

In other words, the packet generated by the processor 111 is transmitted to the router 20 via the interconnection network interface 110, and data transmitted from the router 20 is transmitted to the computation node 100 via the interconnection network interface 110.

The interconnection network interface 110 includes the packet transmitting circuit 113, a packet transmission time table 114, a configuration information holder 115, and the packet receiving circuit 112 as illustrated in FIG. 3.

The packet receiving circuit 112 includes an internal buffer memory (not illustrated) of a FIFO type. When a packet is acquired from the router 20, the packet receiving circuit 112 stores the acquired packet at the end of the buffer memory. Further, the packet receiving circuit 112 takes a packet from the head of the buffer memory according to a request from the processor 111, and transfers the packet to the processor 111.

The configuration information holder 115 is a holder such as a memory that holds information related to the configuration of the parallel computer system 1.

The interconnection network configuring the parallel computer system 1 is configured as a regularly connected network, and data transceived between the computation nodes 100 passes through a predetermined communication path (transmission path).

In other words, in the parallel computer system 1, when the computation node 100 of the transmission source and the computation node 100 of the destination are specified, the number (the number of links or a metric) of relay devices such as the router 20 through which the packet transceived between the computation nodes 100 passes is specified. Hereinafter, in the parallel computer system 1, the number of links through which a packet passes on a communication path, that is, the number of relay devices such as the router 20 is referred to as a "hop number (h)".

For example, in the example illustrated in FIG. 2, a packet to be transmitted from the computation node 100-1 to the computation node 100-3 is stored in the receiving buffer 211 of the port P1 of the router 20-1, then input to the crossbar switch 22, and stored in the transmitting buffer 212 of the port P3. Then, the packet is transmitted to the router 20-2, stored in the receiving buffer 211 of the port P4 of the router 20-2, and then stored in the transmitting buffer 212 of the port P2 via the crossbar switch 22. Thereafter, the packet is transmitted to the computation node 100-4 that is the transmission destination. In the transmission of the packet to be transmitted from the computation node 100-1 to the computation node 100-3, the hop number (h) is equal to the number of the routers 20 to be passed, that is, h=2.

Further, in the router 20, a time taken when a packet passes through the router 20 is specified as a transfer delay time (D) per hop. Further, in the router 20, a sum of buffer sizes of the transmitting buffer 212 and the receiving buffer 211 to pass when a packet is transferred once is specified as a router buffer amount (B) per hop.

Further, in the parallel computer system 1, for each transmission path of a packet between the computation nodes 100, a transfer speed (T) at which no congestion occurs is specified by a calculation or measurement.

In the configuration information holder 115, the hop number (h) or the transfer speed (T) at which no congestion occurs are recorded in association with each communication path in the parallel computer system 1. The configuration information held in the configuration information holder 115 further includes the transfer delay time (D) per hop, the router buffer amount (B) per hop, and the packet length (L) for the router 20. The configuration information recorded in the configuration information holder 115 may be obtained when the parallel computer system 1 is designed, and for example, the configuration information is generated when the system is designed. The configuration information is stored in the configuration information holder 115 in a memory (not illustrated) in a format that can be referred to by the packet transmitting circuit 113 which will be described later. For example, the configuration information stored in the configuration information holder 115 may be stored in a form such as a database or a table or may be modified in various forms and implemented.

The packet transmission time table 114 manages a transmission time of each packet transmitted by the packet transmitting circuit 113.

Figure 4:
FIG. 4 is a diagram illustrating a transmission time table in the parallel computer system according to the first embodiment.

FIG. 4 is a diagram illustrating the packet transmission time table 114 in the parallel computer system 1 according to the first embodiment.

In the example illustrated in FIG. 4, the packet transmission time table 114 records entries such as a packet identifier p, a packet transmission time, and a message identifier m in association with one another.

The packet transmission time table 114 is used in measuring a time (a round trip time) until a response packet is received after a packet is transmitted.

The packet identifier p is an identifier uniquely set to identify an individual packet. The packet transmission time is a time at which a packet is transmitted through the packet transmitting circuit 113. The message identifier m is an identifier set to identify a message configured with packets.

For example, the information stored in the packet transmission time table 114 is generated by the packet transmitting circuit 113, and stored in the packet transmission time table 114 as necessary when a packet is transmitted.

Further, the entries recorded in the packet transmission time table 114 are deleted from the packet transmission time table 114 when a corresponding response packet is received through the packet receiving circuit 112. Thus, it is possible to determine whether a specific packet is a packet (message) being transmitted in a state in which a response packet does not arrive with reference to the packet transmission time table 114.

The packet transmitting circuit 113 includes an internal buffer memory such as a FIFO. When a message that is data transmitted by the processor 111 is acquired, the packet transmitting circuit 113 divides the acquired message into packets, and stores the divided packets in the buffer memory. Further, the packet transmitting circuit 113 takes packets from the buffer memory according to the request from the router 20, and outputs the packets to the router 20.

Further, the packet transmitting circuit 113 has a function of a standby time calculator 11 and a function of a transmission controller 12 as illustrated in FIG. 1.

The standby time calculator (transmission interval calculator) 11 calculates a predictive arrival time that is predicted from a configuration of an interconnection network configuring the parallel computer system 1.

Specifically, when the packet receiving circuit 112 receives the response packet, the standby time calculator 11 reads a packet transmission time of a transmission packet corresponding to the response packet from the packet transmission time table 114. Further, the standby time calculator 11 reads the hop number (h) representing the number of relay devices such as routers through which the packet has passed and a transfer delay amount (D) per hop in the communication path from the configuration information holder 115, and multiplies the hop number by the delay amount to calculate a value (h×D).

Then, the standby time calculator 11 obtains the predictive arrival time by adding the calculated value (h×D) to the packet transmission time read from the packet transmission time table 114.

Further, the standby time calculator 11 compares the calculated predictive arrival time with an actual arrival time at which the response packet actually arrived. When the actual arrival time is later than the calculated predictive arrival time, the standby time calculator 11 further calculates an arrival time difference (d) by subtracting the predictive arrival time from the actual arrival time.

The standby time calculator 11 calculates an effective transfer speed (t) of the packet in the communication path using the calculated difference (d) and the hop number (h) and the router buffer amount (B) per hop which are read from the configuration information holder 115.

A congestion-occurred state is considered to be a state in which all buffers on the communication path are depleted and a state in which all buffers on the communication path of up to the transmission destination are fully filled with packets. In this regard, the effective transfer speed (t) is calculated using the following Formula (1) under the assumption that a data amount corresponding to a total buffer size represented by h×B on the communication path is transferred during a period of time d.

$$t = h \times B / d \tag{1}$$

Then, the standby time calculator 11 calculates a packet transmission interval (g) using the following Formula (2) in order to use the calculated effective transfer speed (t) as a subsequent data transmission speed.

$$g = (L/t) - (L/T) \tag{2}$$

Further, when calculating the packet transmission interval (g), the standby time calculator 11 also reads the packet length (L) and the transfer speed (T) at which no congestion occurs from the configuration information holder 115. Further, the standby time calculator 11 may stores the calculated packet transmission interval (g) in a memory (not illustrated) or the like.

The transmission controller 12 performs packet transmission control using the packet transmission interval (g) calculated by the standby time calculator 11 as a transmission interval at which a plurality of packets are consecutively transmitted. Specifically, a plurality of packets are consecutively transmitted such that a preceding packet is transmitted, and then a subsequent packet is transmitted after the packet transmission interval (g) elapses. In other words, the packet transmission interval (g) corresponds to a standby time between packets.

As the packet transmission interval (g) is set between packets and then packet transmission control is performed, packets are transmitted at the effective transfer speed (t).

In other words, what packets are transmitted at the packet transmission interval (g) obtained by Formula (2) corresponds to what a packet interval is adjusted according to a transfer speed in a communication path in which congestion is occurring, and a new packet is transmitted on the communication path in which congestion is occurring. In other words, a packet transfer speed is lowered according to an actual throughput in a communication path, and then packets are sequentially transmitted. As a result, a packet congestion situation in a communication path does not get any worse than that. Thus, congestion is finally solved.

In the parallel computer system 1, when congestion occurs in a communication path, the value of the effective transfer speed (t) decreases, and as a result, the value of the packet transmission interval (g) increases. As a result, the transmission controller 12 transmits packets at the large packet transmission interval (g), and thus the packet congestion situation in the communication path is mitigated, and congestion is consequently solved.

The respective functions as the standby time calculator 11 or the transmission controller 12 may be implemented by an electronic circuit or may be implemented as a process (not illustrated) executes a program.

Figure 5:
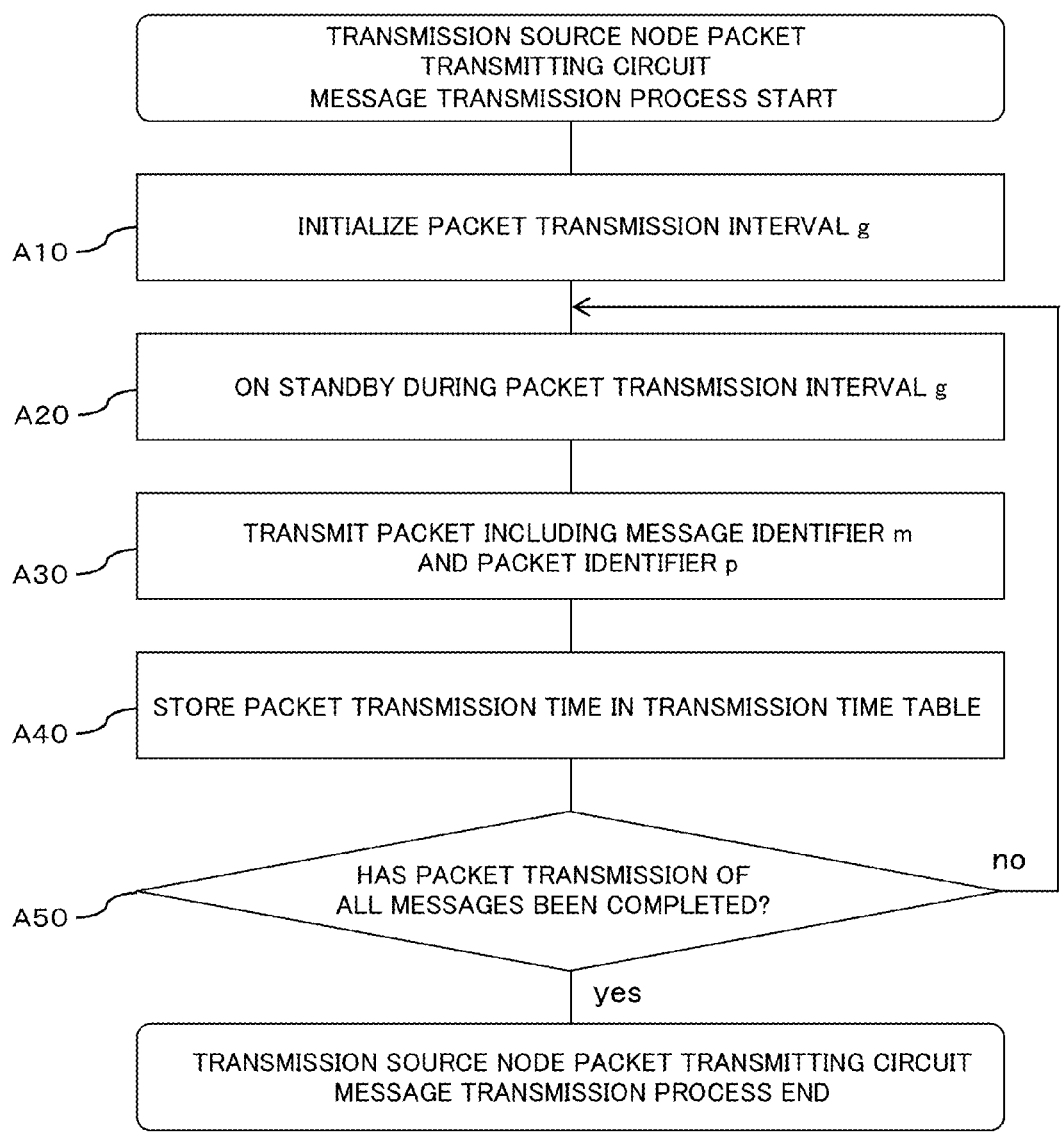
FIG. 5 is a flowchart for describing a process when a message is transmitted in the parallel computer system according to the first embodiment.

A process when a message is transmitted in the parallel computer system 1 having the above-described configuration according to the first embodiment will be described with reference to a flowchart (Steps A10 to A50) illustrated in FIG. 5.

When the packet transmitting circuit 113 of the computation node 100 of the message transmission source (transmitting node) starts a message transmission process, the packet transmitting circuit 113 first performs initialization by setting the packet transmission interval (g) to an initial value in advance (Step A10). For example, the initial value of the packet transmission interval (g) is zero (g=0).

The transmission controller 12 is on standby until the packet transmission interval (g) elapses (Step A20), and transmits a packet when the packet transmission interval (g) elapses (Step A30). The message identifier m or the packet identifier p is added to a packet to be transmitted.

As the packet is transmitted, the packet transmitting circuit 113 records information related to the transmitted packet in the packet transmission time table 114 (Step A40). In other words, the packet identifier p of the transmitted packet or the message identifier m, and the transmission time are recorded in the packet transmission time table 114.

The packet transmitting circuit 113 checks whether all packets configuring a message have been transmitted (Step A50). When at least one of all packets has not been transmitted (see a no route of Step A50), the process returns to Step A20. However, when all packets have been transmitted (see a yes route of Step A50), the message transmission process is completed.

Figure 6:
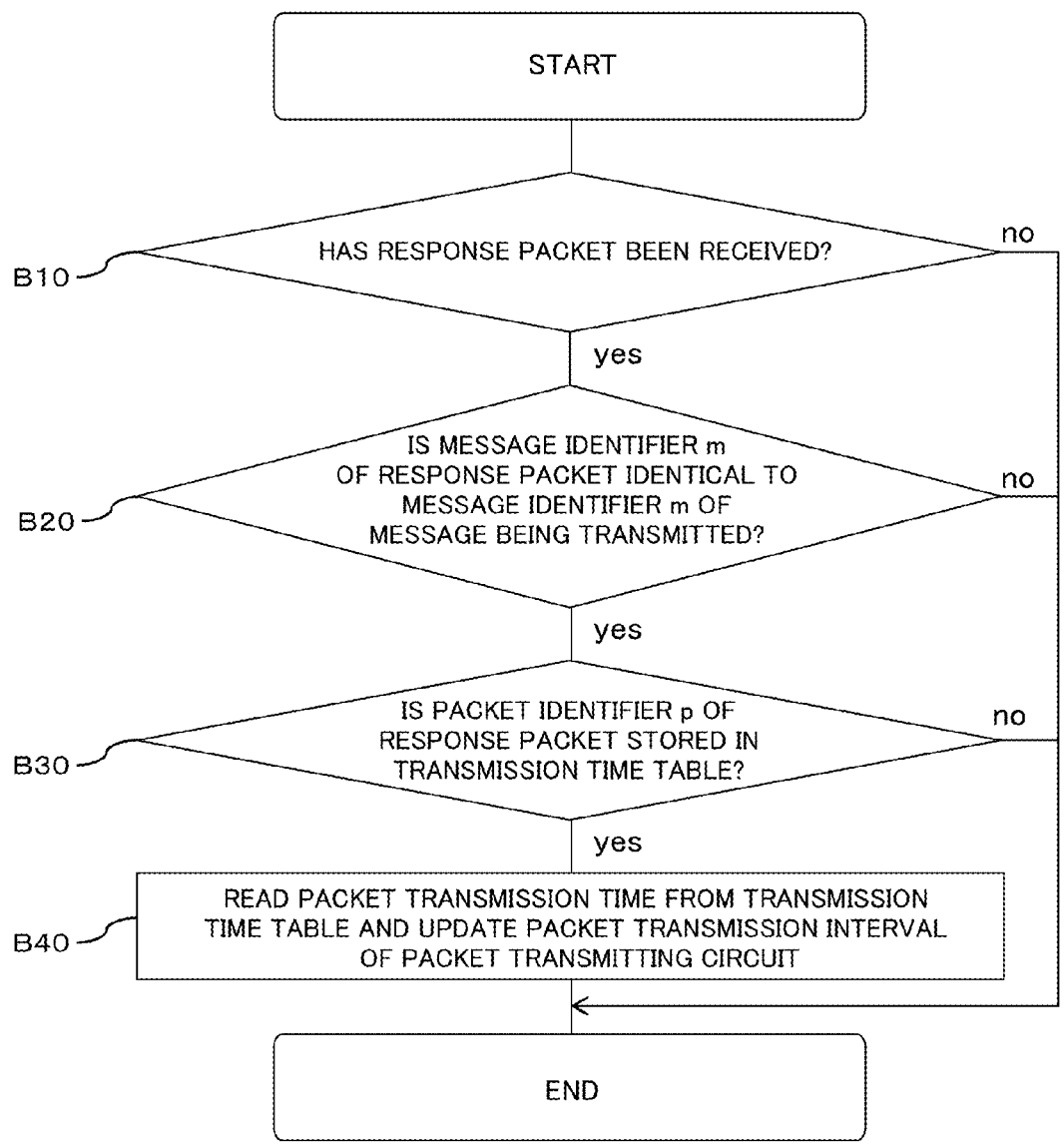
FIG. 6 is a flowchart for describing a process when a response packet is received in the parallel computer system according to the first embodiment.

Next, a process when a response packet is received in the parallel computer system 1 according to the first embodiment will be described with reference to a flowchart (Steps B10 to B40) illustrated in FIG. 6.

In the computation node 100 of the message transmission source (transmitting node), it is checked whether a response packet to the transmitted packet has been received (Step B10), and when the response packet has not been received (see a no route of Step B10), the process ends. In other words, the packet receiving circuit 112 enters the standby state for receiving the response packet.

When the response packet has been received (see a yes route of Step B10), the packet transmitting circuit 113 checks whether the message identifier m of the response packet is identical to the message identifier m of the packet recorded in the packet transmission time table 114 (Step B20).

Then, when the message identifier m of the response packet is identical to the message being transmitted (see a yes route of Step B20), the packet transmitting circuit 113 checks whether the packet identifier p of the response packet remains recorded in the packet transmission time table 114 (Step B30).

When the packet identifier p of the response packet remains recorded in the packet transmission time table 114 (see a yes route of Step B30), the standby time calculator 11 calculates the packet transmission interval (g).

The standby time calculator 11 reads the packet transmission time corresponding to the packet identifier p of the response packet from the packet transmission time table 114, calculates the predictive arrival time, and compares the predictive arrival time with the current reception time of the response packet, that is, the actual arrival time. As a result of comparing the predictive arrival time with the actual arrival time, when the actual arrival time is later than the calculated predictive arrival time, that is, when it is determined that congestion occurred, the standby time calculator 11 calculates the arrival time difference (d) by subtracting the predictive arrival time from the actual arrival time. Then, the standby time calculator 11 calculates the effective transfer speed (t) using Formula (1) described above, and calculates the packet transmission interval (g) using Formula (2) described above. Further, as a result of comparison, when the calculated predictive arrival time is not identical to the actual arrival time, that is, when congestion does not occur, for example, the packet transmission interval (g) becomes zero (g=0).

The packet transmitting circuit 113 updates the packet transmission interval (g) based on the packet transmission interval (g) calculated by the standby time calculator 11 (Step B40).

Then, the transmission controller 12 sequentially transmits packets using the packet transmission interval (g) calculated by the standby time calculator 11 as the packet interval.

Meanwhile, when the message identifier m of the response packet is not identical to the message being transmitted (see a no route of Step B20) or when the packet identifier p of the response packet does not remain recorded in the packet transmission time table 114 (see a no route of Step B30), the process ends.

As described above, according to the parallel computer system 1 according to the first embodiment, the effective transfer speed (t) of packets in the communication path is calculated, and the packet transmission interval (g) is calculated using Formula (2). Then, the transmission controller 12 transmits packets at the calculated packet transmission interval (g).

Thus, packets are sequentially transmitted according to the actual throughput in the communication path, and so congestion can be solved. In other words, it is possible to efficiently implement congestion control according to the effective transfer speed (t) in the communication path, and it is possible to efficiently use the interconnection network in the parallel computer system 1.

In the parallel computer system 1 according to the first embodiment, the arrival time of the response packet using the hop number (h) in the communication path of up to the transmission destination (destination) when congestion does not occur is predicted, and the difference between the actual arrival time and the predictive time is measured. Further, the effective transfer speed (t) is calculated based on the difference in the arrival time and the total buffer size (h×B) of up to the destination, and the packet transfer speed is lowered up to the calculated effective transfer speed.

In the congestion control scheme of the parallel computer system 1 according to the first embodiment, when congestion is solved, the arrival time of the response packet is identical to the predictive arrival time, the data transfer speed of the computation node 100 of the transmission source is increased, and congestion reoccurs. In other words, as the network state is maintained between a congestion-solved state and a state with a narrow congestion influence range, an effect of maintaining the network (communication network) usage efficiency is obtained. Further, an effect of preventing an increase in a congestion influence range compared to when congestion control is not performed is obtained.

Further, according to the congestion control scheme of the parallel computer system 1 according to the first embodiment, for example, a complicated mechanism in which a relay device such as a router detects congestion and gives notification to the computation node 100 of the transmission source is not required. In other words, an effect of reducing an introduction cost or an operation cost is obtained.

Further, the present technology can be appropriately used in a network in which lossless packet transfer is performed.

(B) Second Embodiment

Figure 7:
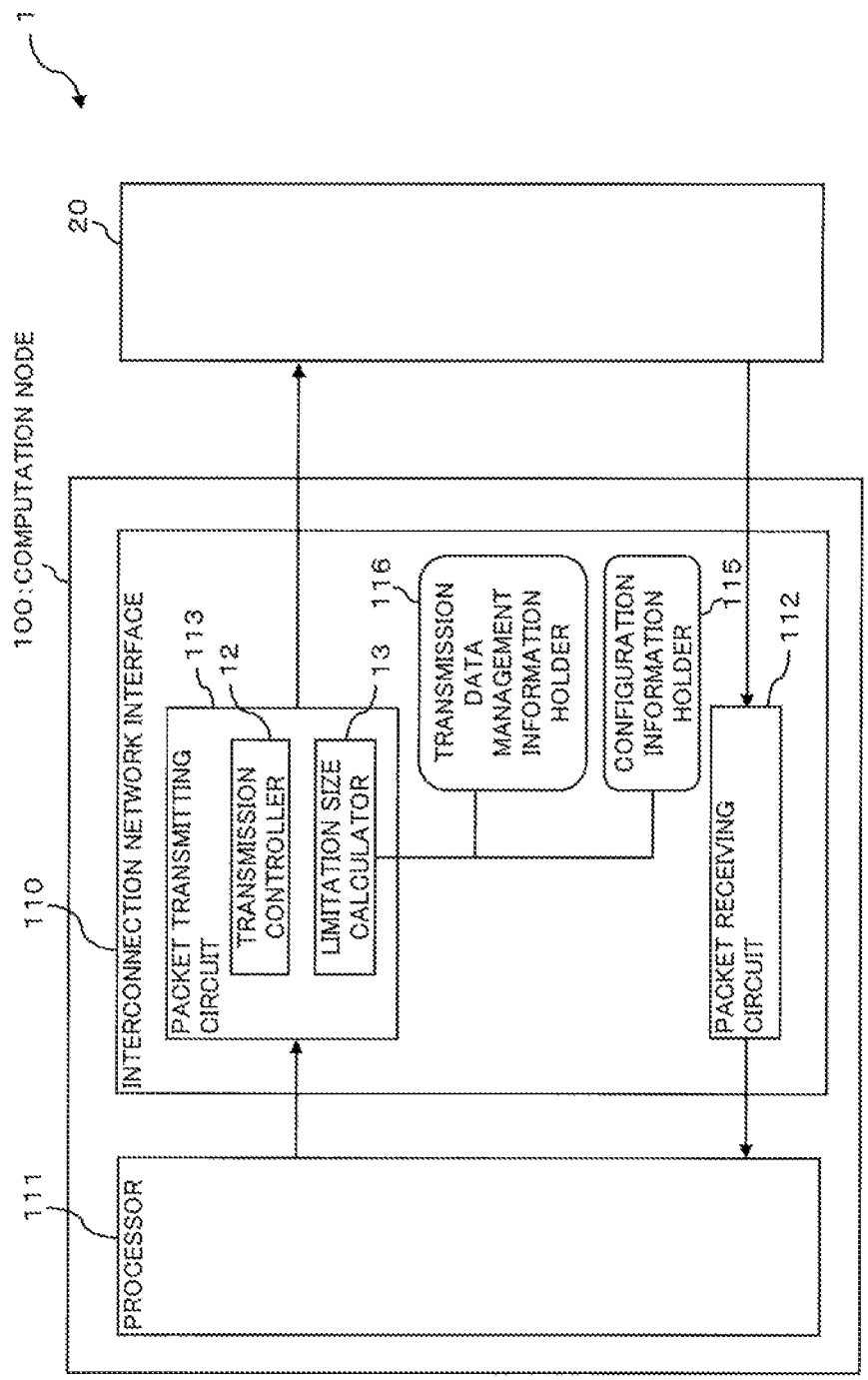
FIG. 7 is a diagram schematically illustrating a functional configuration of an interconnection network interface equipped in a parallel computer system according to a second embodiment.

FIG. 7 is a diagram schematically illustrating a functional configuration an interconnection network interface equipped in a parallel computer system 1 according to a second embodiment.

The parallel computer system 1 according to the second embodiment has the same hardware configuration as in the parallel computer system 1 according to the first embodiment which is illustrated in FIGS. 2 and 3 and is configured with an interconnection network.

Illustrated in FIG. 7, the parallel computer system 1 according to the second embodiment includes a limitation size calculator 13 instead of the standby time calculator 11 of the first embodiment. Further, the parallel computer system 1 according to the second embodiment includes a transmission data management information holder 116 instead of the packet transmission time table 114 of the first embodiment.

Further, in the parallel computer system 1 according to the second embodiment, the transmission controller 12 transmits packets through window control in which a total data amount of transmission packets in which the response packet does not arrive is controlled to be a window size w (limitation size) or less.

The remaining components are the same as in the parallel computer system 1 according to the first embodiment. In the drawings, the same reference numerals as the above-described reference numerals denote the same parts, and thus a detailed description thereof is appropriately omitted.

The transmission controller 12 performs the window control such that the data amount in which the response packet is not received in the computation node 100 of the transmission source remains to be a certain amount or less. Specifically, when the total data amount of the transmission packets in which the response packet has not arrived at exceeds the window size (w), the transmission controller 12 stops packet transmission.

Further, the packet transmitting circuit 113 records the packet transmission time at a certain position of the transmission packet. The packet transmission time recorded in the transmission packet is also stored in the response packet transmitted from the computation node 100 of the transmission destination in response to the transmission packet. As a result, it is possible to measure the round trip time that is a time taken until the response packet is received after the transmission packet is transmitted.

The transmission data management information holder 116 is a holder such as a memory that holds information about a packet in which a response packet does not arrive among packets transmitted by the packet transmitting circuit 113.

Specifically, transmission data management information held in the transmission data management information holder 116 includes the message identifier m and the data size of a packet in which a response packet does not arrive among packets transmitted by the packet transmitting circuit 113. The transmission data management information further includes a total amount (a non-response data amount) of the data sizes of packets in which a response packet does not arrive among packets transmitted by the packet transmitting circuit 113.

The limitation size calculator 13 calculates a predictive arrival time that is predicted from a configuration of an interconnection network configuring the parallel computer system 1.

Specifically, when the packet receiving circuit 112 receives the response packet, the limitation size calculator 13 reads a packet transmission time recorded in the response packet. Further, the limitation size calculator 13 reads the hop number (h) representing the number of relay devices such as routers through which the packet has passed and a transfer delay amount (D) per hop in the communication path from the configuration information holder 115, and multiplies the hop number by the transfer delay amount to calculate a value (h×D).

Then, the limitation size calculator 13 obtains the predictive arrival time by adding the calculated value (h×D) to the packet transmission time read from the response packet.

Further, the limitation size calculator 13 compares the calculated predictive arrival time with a time (actual arrival time) at which the response packet actual arrived. When the actual arrival time is later than the calculated predictive arrival time, the limitation size calculator 13 further calculates an arrival time difference (d) by subtracting the predictive arrival time from the actual arrival time.

Further, the limitation size calculator 13 approximately calculates an effective transfer speed (t) of the packet in the communication path using the calculated difference (d) and the hop number (h) and the router buffer amount (B) per hop which are read from the configuration information holder 115. In other words, the limitation size calculator 13 calculates the effective transfer speed (t) using Formula (1) described above, similarly to the standby time calculator 11 of the first embodiment.

Then, the limitation size calculator 13 calculates the window size (w) using the following Formula (3) in order to the calculated effective transfer speed (t) as a subsequent data transmission speed.

$$w = 2 \times h \times D \times t \quad (3)$$

The limitation size calculator 13 may stores the calculated window size (w) in a memory (not illustrated) or the like.

Further, in the parallel computer system 1 according to the second embodiment, an initial value of the window size (w) is set to w=2×h×D×T.

The window size w (=2×h×D×T) is a value used to obtain the effective transfer speed (T) in the non-congestion state, and represents a maximum value of the window size (w). Further, 2×h×D corresponds to a reciprocation transmission delay time in a data communication path.

When congestion occurs in a communication path, the effective transfer speed (t) is lowered. In the parallel computer system 1, as the effective transfer speed (t) is lowered, the window size (w) is reduced. As the window size (w) is reduced, packet transmission is suppressed by the window control. As a result, the non-response data amount is reduced, and thus a delay (congestion) in the communication path is solved. When the congestion in the communication path is solved, the effective transfer speed (t) is increased, and the window size (w) is increased. As the window size (w) is increased, the number of transmittable packets is increased.

The respective functions as the limitation size calculator 13 or the transmission controller 12 may be implemented by an electronic circuit or may be implemented as a process (not illustrated) executes a program.

Figure 8:
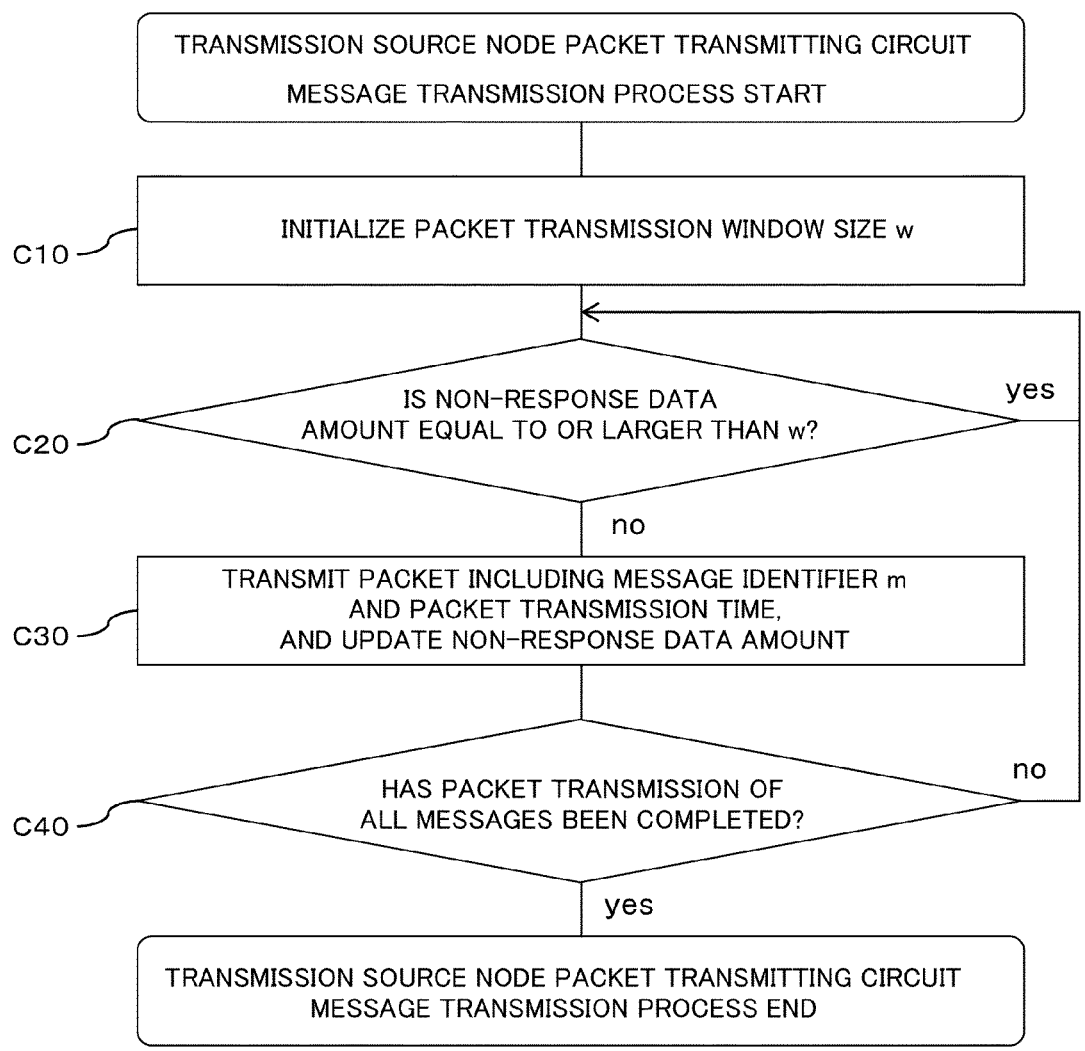
FIG. 8 is a flowchart for describing a process when a message is transmitted in the parallel computer system according to the second embodiment.

A process when a message is transmitted in the parallel computer system 1 having the above-described configuration according to the second embodiment will be described with reference to a flowchart (Steps C10 to C40) illustrated in FIG. 8.

When the packet transmitting circuit 113 of the computation node 100 of the message transmission source (transmitting node) starts the message transmission process, the packet transmitting circuit 113 first performs initialization by setting the window size (w) to w=2×h×D×T (Step C10).

The transmission controller 12 checks whether the non-response data amount is the window size (w) or more with reference to the transmission data management information of the transmission data management information holder 116 (Step C20). When the non-response data amount is the window size (w) or more (see a yes route of Step C20), it enters the standby state until the non-response data amount is smaller than the window size (w).

When the non-response data amount is less than the window size (w) (see a no route of Step C20), the transmission controller 12 performs packet transmission (Step C30). The message identifier m or the packet identifier p is added to a packet to be transmitted. Further, as the packet transmission is performed, the packet transmitting circuit 113 updates the transmission data management information of the transmission data management information holder 116. Specifically, the message identifier m of the transmitted packet is registered, or the data size of the transmitted packet is added to the non-response data amount.

The packet transmitting circuit 113 checks whether all packets configuring a message have been transmitted (Step C40). When at least one of all packets has not been transmitted (see a no route of Step C40), the process returns to Step C20. However, when all packets have been transmitted (see a yes route of Step C40), the message transmission process is completed.

Figure 9:
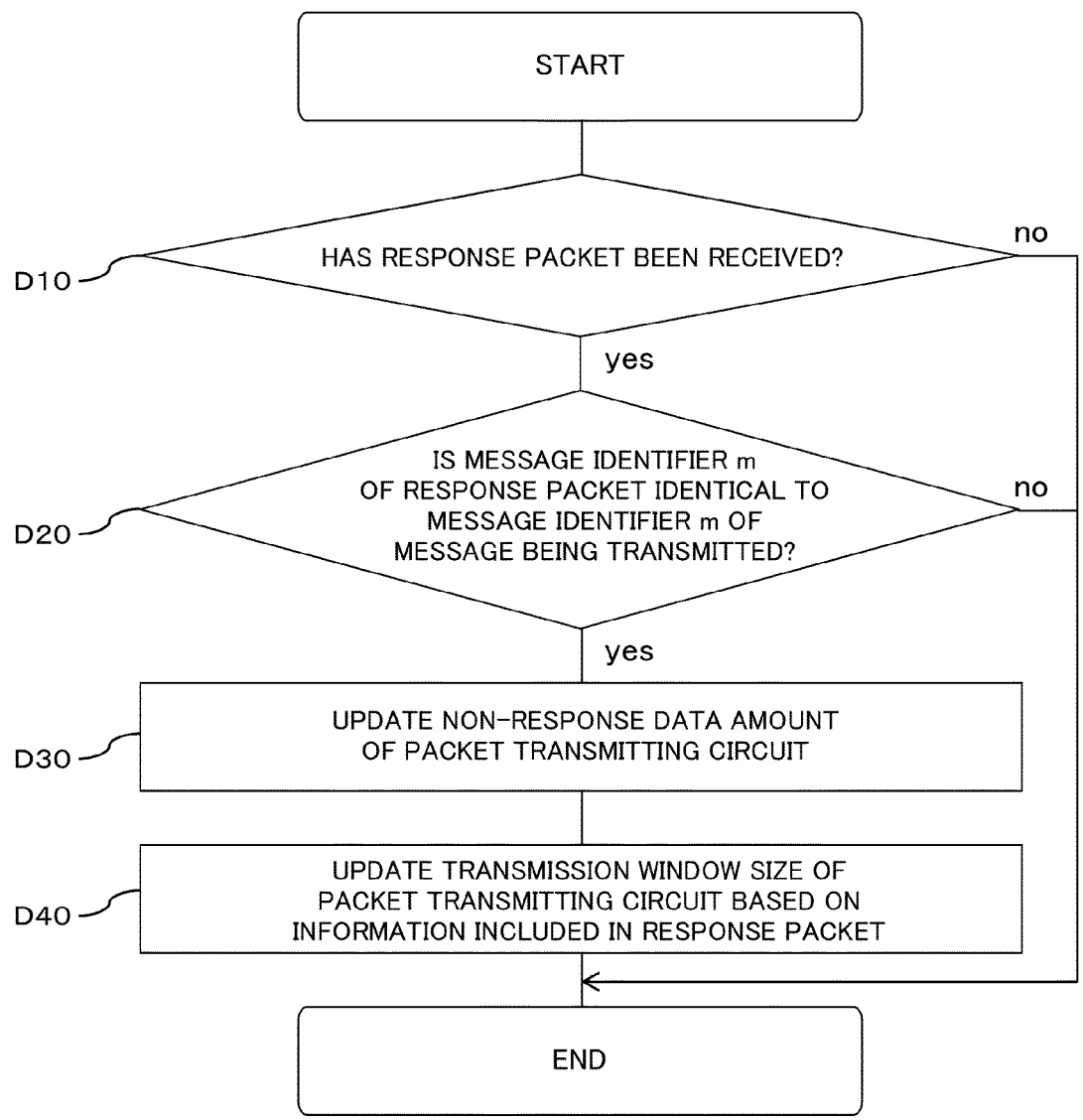
FIG. 9 is a flowchart for describing a process when a response packet is received in the parallel computer system according to the second embodiment.

Next, a process when a response packet is received in the parallel computer system 1 according to the second embodiment will be described with reference to a flowchart (Steps D10 to D40) illustrated in FIG. 9.

In the computation node 100 of the message transmission source (transmitting node), it is checked whether a response packet to the transmitted packet has been received (Step D10), and when the response packet has not been received (see a no route of Step D10), the process ends. In other words, the packet receiving circuit 112 enters the standby state for receiving the response packet.

When the response packet has been received (see a yes route of Step D10), the packet transmitting circuit 113 checks whether the message identifier m of the response packet is identical to the message identifier m of the packet in which a response packet does not arrive which is recorded in the packet transmission time table 114 (Step D20).

Then, when the message identifier m of the response packet is identical to the message being transmitted (see a yes route of Step D20), the packet transmitting circuit 113 updates the non-response data amount in the transmission data management information of the transmission data management information holder 116 (Step D30). In other words, the data size of the transmission packet corresponding to the received response packet is subtracted from the non-response data amount.

Further, in the packet transmitting circuit 113, the limitation size calculator 13 reads the packet transmission time recorded in the response packet, calculates the predictive arrival time, and compares the predictive arrival time with the reception time, that is, the actual arrival time of the response packet. As a result of comparison, when the actual arrival time is later than the calculated predictive arrival time, the limitation size calculator 13 calculates the arrival time difference (d) by subtracting the predictive arrival time from the actual arrival time. Then, the limitation size calculator 13 calculates the effective transfer speed (t) using Formula (1) described above, and calculates the window size (w) using Formula (3) described above.

The packet transmitting circuit 113 updates the window size (w) based on the window size (w) calculated by the limitation size calculator 13 (Step D40) and process ends.

Meanwhile, when the message identifier m of the response packet is not identical to the message being transmitted (see a no route of Step D20), the process ends.

As described above, in the parallel computer system 1 according to the second embodiment, the same effects as in the first embodiment can be obtained.

In other words, the effective transfer speed (t) of packets in the communication path is calculated, and the window size (w) is calculated using Formula (3). Further, the transmission controller 12 performs packet transmission according to the window control using the calculated window size (w).

Thus, packets are sequentially transmitted according to the actual throughput in the communication path, and so congestion can be solved. In other words, it is possible to implement congestion control according to the effective transfer speed (t) in the communication path, and it is possible to efficiently use the interconnection network in the parallel computer system 1.

In the parallel computer system 1 according to the second embodiment, similarly to the first embodiment, the arrival time of the response packet using the hop number (h) in the communication path of up to the transmission destination (destination) when congestion does not occur is predicted, and the difference between the actual arrival time and the predictive time is measured. Further, the effective transfer speed (t) is estimated based on the difference in the arrival time and the total buffer size (h×B) of up to the destination, and the packet transfer speed is lowered up to the effective transfer speed.

In the congestion control scheme of the parallel computer system 1 according to the second embodiment, similarly to the first embodiment, as the network state is maintained between a congestion-solved state and a state with a narrow congestion influence range, an effect of maintaining the network usage efficiency is obtained. Further, an effect of preventing an increase in a congestion influence range compared to when congestion control is not performed is obtained.

Further, according to the congestion control scheme of the parallel computer system 1 according to the second embodiment, for example, a complicated mechanism in which a relay device such as a router detects congestion and gives notification to the computation node 100 of the transmission source is not required. In other words, an effect of reducing an introduction cost or an operation cost is obtained.

Further, the present technology can be appropriately used in a network in which lossless packet transfer is performed.

(C) Modified Example of First Embodiment

In the first embodiment, the standby time calculator 11 calculates the effective transfer speed (t) based on the hop number (h) of the communication path, but in the present modified example, the effective transfer speed (t) is calculated based on the number of routers 20 (hereinafter, referred to as "congestion routers 20) in which congestion occurred in the communication path.

In the modified example of the first embodiment, a congestion router passage number c is added as a new field in a packet. The congestion router passage number c is a counter value that is increased by the congestion router 20 each time the congestion router 20 is passed through. For example, the congestion router passage number c may be easily implemented by diverting an explicit congestion notification (ECN) field commonly used as a congestion information notification function by which the router 20 notifies an end node of a congestion state.

In other words, the relay device such as the router 20 is provided with a function of increasing the congestion router passage number c instead of inserting a bit into an ECN field. Specifically, in the router 20, when the buffers 211 and 212 enter the standby state at the time of packet transfer, one (1) is added to the congestion router passage number c recorded in the packet. A technique of increasing a specific value in a packet can be implemented using various kinds of known techniques.

Further, when a packet is transmitted from the packet transmitting circuit 113, the computation node 100 of the transmission source initializes the congestion router passage number c to zero (0).

Further, the computation node 100 of the transmission destination copies the congestion router passage number c to the response packet to the received transmission packet, and transmits the response packet including the congestion router passage number c.

Further, the computation node 100 of the transmission source calculates the effective transfer speed (t) and the packet transmission interval (g) using the congestion router passage number c recorded in the response packet.

In other words, the standby time calculator 11 compares the calculated predictive arrival time with a time (actual arrival time) at which the response packet actually arrived, and calculates the arrival time difference (d) by subtracting the predictive arrival time from the actual arrival time when the actual arrival time is later than the calculated predictive arrival time.

Then, the standby time calculator 11 approximately calculates the effective transfer speed (t) of the packet in the communication path using the calculated difference (d) and the congestion router passage number c and the router buffer amount (B) per hop which are read from the response packet.

In the present modified example, the buffer of the congestion router 20 in the communication path of the packet is determined to be in the depleted state, and the buffer of the congestion router 20 in the communication path of up to the transmission destination is considered to the state in which the buffer is fully filled with the packets. In other words, the effective transfer speed (t) is calculated using the following Formula (4) under the assumption that a data amount corresponding to a total buffer size represented by c×B of the congestion router 20 is transferred during a period of time d.

$$t = c \times B / d \qquad (4)$$

Then, the standby time calculator 11 calculates a packet transmission interval (g) using Formula (2) described above in order to use the calculated effective transfer speed (t) as a subsequent data transmission speed.

As described above, according to the parallel computer system 1 of the modified example of the first embodiment, the same effects as in the first embodiment can be obtained, and as the effective transfer speed (t) is calculated based on the number of relay devices in which congestion actually occurred, it is possible to the packet transmission interval (g) appropriate for the state of the parallel computer system 1, and thus reliability is improved.

(D) Modified Example of Second Embodiment

In the second embodiment, the limitation size calculator 13 calculates the effective transfer speed (t) based on the hop number (h) of the communication path, but in the modified example of the second embodiment, similarly to the modified example of the first embodiment, the effective transfer speed (t) is calculated based on the number of congestion routers 20 in the communication path.

In other words, in the modified example of the second embodiment, similarly to the modified example of the first embodiment, the congestion router passage number c is added as a new field in a packet, and the congestion router passage number c is increased by the congestion router 20 each time the congestion router 20 is passed through.

Further, when a packet is transmitted from the packet transmitting circuit 113, the computation node 100 of the transmission source initializes the congestion router passage number c to zero (0).

Further, the computation node 100 of the transmission destination copies the congestion router passage number c to the response packet to the received transmission packet, and transmits the response packet including the congestion router passage number c.

Further, the computation node 100 of the transmission source calculates the effective transfer speed (t) and the packet transmission interval (g) using the congestion router passage number c recorded in the response packet.

In other words, the limitation size calculator 13 compares the calculated predictive arrival time with a time (actual arrival time) at which the response packet actually arrived, and calculates the arrival time difference (d) by subtracting the predictive arrival time from the actual arrival time when the actual arrival time is later than the calculated predictive arrival time.

Then, the limitation size calculator 13 approximately calculates the effective transfer speed (t) of the packet in the communication path using the calculated difference (d) and the congestion router passage number c and the router buffer amount (B) per hop which are read from the response packet.

In the present modified example, the limitation size calculator 13 calculates the effective transfer speed (t) using Formula (4) described above.

Then, the limitation size calculator 13 calculates a window size (w) using Formula (3) described above in order to use the calculated effective transfer speed (t) as a subsequent data transmission speed.

As described above, according to the parallel computer system 1 of the modified example of the second embodiment, the same effects as in the second embodiment can be obtained, and as the effective transfer speed (t) is calculated based on the number of the routers 20 in which congestion actually occurred, it is possible to the packet transmission interval (g) appropriate for the state of the parallel computer system 1, and thus reliability is improved.

(E) Others

The present invention is not limited to the above embodiments, and various changes can be made within the range not departing from the gist of the present invention.

For example, in the above embodiments and the modified examples, the parallel computer system 1 is configured with the four computation nodes 100 and the two routers 20, but the present invention is not limited to this example. In other words, in the interconnection network, three or less or five or more computation nodes 100 may be arranged, and three or more routers 20 may be arranged. Further, in addition to the router 20, a relay device such as a switch or a repeater may be arranged. Further, when the interconnection network is configured with three or more routers 20 and the like, connection states of the relay devices and the computation node 100 can be appropriately changed.

Further, in the first embodiment and the modified examples, the packet transmission time table 114 is provided, and the round trip time is measured with reference to the packet transmission time table 114, but the present invention is not limited to this example. In other words, for example, similarly to the parallel computer system 1 of the second embodiment, the packet transmitting circuit 113 may record the packet transmission time at a certain position of the transmission packet and measure the round trip time.

Similarly, in the second embodiment and the modified examples, the packet transmitting circuit 113 records the packet transmission time at a certain position of the transmission packet and measure the round trip time, but the present invention is not limited to this example. In other words, for example, similarly to the parallel computer system 1 according to the first embodiment, the packet transmission time table 114 may be provided.

Further, in the above embodiments and the modified examples, the difference between the actual arrival time and the predictive time is measured, and when the occurrence of congestion is detected, the packet transmission interval (g) or the window size (w) is decided or updated so that the packet transfer speed matches the effective transfer speed, but the present invention is not limited to this example. For example, when the occurrence of congestion is detected, packet transmission is temporarily suppressed during a certain period of time, and thereafter, the packet transmission interval (g) or the window size (w) may be decided or updated so that the packet transfer speed matches the effective transfer speed.

As packet transmission is temporarily suppressed during a certain period of time when the occurrence of congestion is detected, congestion can be solved rapidly. Further, as the packet transmission interval (g) or the window size (w) is decided or updated so that the packet transfer speed matches the effective transfer speed thereafter, packet transmission can be effectively performed.

According to the technique of the disclosure, at least one of the following effects or advantages is obtained.

(1) It is possible to efficiently implement congestion control.

(2) It is possible to efficiently an interconnection network.

(3) It is possible to prevent an increase in a congestion influence range.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A data communication apparatus configured to transmit data to another data communication apparatus through a relay device, comprising:
    a transmission interval calculator configured to calculate an effective transfer speed of the data based on a difference between an actual arrival time at which response data to transmission data transmitted to the other data communication apparatus has arrived and a predictive arrival time calculated by multiplying the number of relay devices passed until the response data transmitted from the other data communication apparatus arrives at the data communication apparatus by a transfer delay time necessary to pass through one relay device and a buffer size of the relay device on a communication path of the data, and calculate a transmission interval of transmission data by subtracting a value obtained by dividing a data length of the data by a non-congestion transfer speed at which congestion does not occur from a value obtained by dividing the data length by the effective transfer speed; and
    a transmission controller configured to perform transmission control of transmission data based on the calculated transmission interval.

2. A data communication apparatus configured to transmit data to another data communication apparatus through a relay device, comprising:
    a transmission controller configured to transmit data such that a total data amount that is a sum of data amounts of transmission data in which response data to transmission data transmitted to the other data communication apparatus does not arrive is a limitation size or less; and
    a limitation size calculator configured to calculate an effective transfer speed ($t=h\times B/d$) of the data by dividing a product ($h\times B$) of a buffer size (B) of the relay device on a communication path and the number (h) of relay devices passed until the response data transmitted from the other data communication apparatus arrives at the data communication apparatus by a difference (d) between an actual arrival time at which response data to transmission data transmitted to the other data communication apparatus has arrived and a predictive arrival time, and calculate the limitation size based on the calculated effective transfer speed.

3. The data communication apparatus according to claim 2, wherein a value calculated by multiplying a reciprocation transmission delay time calculated by doubling a value obtained by multiplying the number of relay devices passed until the response data arrives by a transfer delay time necessary to pass through one relay device by an effective data transfer speed at which congestion does not occur is set as an initial value of the limitation size.

4. The data communication apparatus according to claim 3, wherein the limitation size calculator calculates the limitation size by multiplying the reciprocation transmission delay time by the effective transfer speed.

5. A data transmission method of transmitting data through a relay device, comprising:
    calculating, by a computer, an effective transfer speed of the data based on a difference between an actual arrival time at which response data to transmitted transmission data has arrived and a predictive arrival time calculated by multiplying the number of relay devices passed until the response data arrives by a transfer delay time necessary to pass through one relay device and a buffer size of the relay device on a communication path of the data;
    calculating, by the computer, a transmission interval of transmission data by subtracting a value obtained by dividing a data length of the data by a non-congestion transfer speed at which congestion does not occur from a value obtained by dividing the data length by the effective transfer speed; and
    performing transmission control of transmission data based on the calculated transmission interval.

6. A data transmission method of transmitting data to another data communication apparatus through a relay device, comprising:
    calculating an effective transfer speed ($t=h\times B/d$) of the data by dividing a product ($h\times B$) of a buffer size (B) of the relay device on a communication path and the number (h) of relay devices passed until the response data transmitted from the other data communication apparatus arrives at the data communication apparatus by a difference (d) between an actual arrival time at which response data to transmission data transmitted to the other data communication apparatus has arrived and a predictive arrival time by a transfer delay time necessary to pass through one relay device and a buffer size of the relay device on a communication path of the data;
    calculating a limitation size based on the calculated effective transfer speed; and
    transmitting data such that a total data amount that is a sum of data amounts of transmission data in which response data to transmission data transmitted to the other data communication apparatus does not arrive is a limitation size or less.

7. The data transmission method according to claim 6, wherein a value calculated by multiplying a reciprocation transmission delay time calculated by doubling a value obtained by multiplying the number of relay devices passed until the response data arrives by a transfer delay time necessary to pass through one relay device by an effective data transfer speed at which congestion does not occur is set as an initial value of the limitation size.

8. The data transmission method according to claim 7, wherein the limitation size is calculated by multiplying the reciprocation transmission delay time by the effective transfer speed.

9. A computer system, comprising:
    a communication network configured to include a plurality of relay devices; and
    a plurality of computation nodes configured to perform transmission and reception of data through the communication network,
    wherein the computer node comprises
    a transmission interval calculator configured to calculate an effective transfer speed of the data based on a difference between an actual arrival time at which response data to transmission data transmitted to the other computation node has arrived and a predictive arrival time calculated by multiplying the number of relay devices passed until the response data transmitted from the other computation node arrives at the computation node by a transfer delay time necessary to pass through one relay device and a buffer size of the relay device on a communication path of the data, and calculate a transmission interval of transmission data by subtracting a value obtained by dividing a data length of the data by a non-congestion transfer speed at which congestion does not occur from a value obtained by dividing the data length by the effective transfer speed, and a transmission controller configured to perform transmission control of transmission data based on the calculated transmission interval.

10. A computer system, comprising:
a communication network configured to include a relay device; and
a plurality of computation nodes configured to perform transmission and reception of data through the communication network,
wherein the computation node comprises
a transmission controller configured to transmit data such that a total data amount that is a sum of data amounts of transmission data in which response data to transmission data transmitted to the other computation node does not arrive is a limitation size or less; and
a limitation size calculator configured to calculate an effective transfer speed ($t=h \times B/d$) of the data by dividing a product ($h \times B$) of a buffer size (B) of the relay device on a communication path and the number (h) of relay devices passed until the response data transmitted from the other data communication apparatus arrives at the data communication apparatus by a difference (d) between an actual arrival time at which response data to transmission data transmitted to the other computation node has arrived and a predictive arrival time by a transfer delay time necessary to pass through one relay device and a buffer size of the relay device on a communication path of the data, and calculate the limitation size based on the calculated effective transfer speed.

11. The computer system according to claim 10, wherein a value calculated by multiplying a reciprocation transmission delay time calculated by doubling a value obtained by multiplying the number of relay devices passed until the response data arrives by a transfer delay time necessary to pass through one relay device by an effective data transfer speed at which congestion does not occur is set as an initial value of the limitation size.

12. The computer system according to claim 11, wherein the limitation size calculator calculates the limitation size by multiplying the reciprocation transmission delay time by the effective transfer speed.

* * * * *